United States Patent
Padgett et al.

(10) Patent No.: US 7,805,408 B2
(45) Date of Patent: Sep. 28, 2010

(54) UNIFIED MECHANISM FOR PRESENTING AND RESOLVING GROUPED SYNCHRONIZATION CONFLICTS

(75) Inventors: Neil Leonard Padgett, Redmond, WA (US); Ashish B Shah, Sammamish, WA (US); Edward Eric Thomas, Redmond, WA (US); Darshatkumar Shah, Redmond, WA (US); Muhunthan Sivapragasam, Kirkland, WA (US); Lev Novik, Bellevue, WA (US); Lei Tang, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 294 days.

(21) Appl. No.: 11/450,664

(22) Filed: Jun. 9, 2006

(65) Prior Publication Data

US 2007/0299882 A1   Dec. 27, 2007

(51) Int. Cl.
*G06F 7/00* (2006.01)
*G06F 17/00* (2006.01)

(52) U.S. Cl. ..................................... 707/634

(58) Field of Classification Search ................ 707/634, 707/610
See application file for complete search history.

(56) References Cited

U.S. PATENT DOCUMENTS

| | | | | |
|---|---|---|---|---|
| 5,027,305 A * | 6/1991 | Tanaka et al. | ................. | 706/48 |
| 5,889,953 A * | 3/1999 | Thebaut et al. | ............. | 709/221 |
| 6,021,413 A * | 2/2000 | Vaduvur et al. | ............. | 707/201 |
| 6,131,096 A | 10/2000 | Ng et al. | ...................... | 707/10 |
| 6,792,436 B1 | 9/2004 | Zhu et al. | .................... | 707/203 |
| 6,879,989 B2 | 4/2005 | Cheng et al. | ................ | 707/201 |
| 6,910,052 B2 | 6/2005 | Gates et al. | ................. | 707/201 |
| 6,957,776 B1 | 10/2005 | Ng | .............................. | 235/474 |
| 6,973,464 B1 | 12/2005 | Gao | ........................... | 707/201 |
| 2003/0097381 A1 | 5/2003 | Detweiler et al. | ........... | 707/201 |
| 2003/0220966 A1 * | 11/2003 | Hepper et al. | ................ | 709/203 |
| 2004/0098417 A1 | 5/2004 | Nishikawa et al. | .......... | 707/201 |
| 2005/0044187 A1 * | 2/2005 | Jhaveri et al. | ............... | 709/219 |
| 2005/0049993 A1 * | 3/2005 | Nori et al. | ....................... | 707/1 |
| 2005/0144195 A1 | 6/2005 | Hesselink et al. | ........... | 707/201 |
| 2005/0149582 A1 | 7/2005 | Wissmann et al. | .......... | 707/201 |
| 2005/0198453 A1 | 9/2005 | Osaki | ......................... | 711/162 |
| 2006/0041893 A1 | 2/2006 | Castro et al. | ................. | 719/320 |
| 2006/0053347 A1 * | 3/2006 | van Ingen et al. | ............. | 714/47 |

OTHER PUBLICATIONS

Grimes, R., "Revolutionary File Storage System Lets Users Search and Manage Files Based on Content," MSDN magazine, Jan. 2004, 6 pages http://msdn.microsoft.com/msdnmag/issues/04/01/WinFS/.

(Continued)

*Primary Examiner*—John R. Cottingham
*Assistant Examiner*—Nicholas E Allen
(74) *Attorney, Agent, or Firm*—Woodcock Washburn LLP

(57) ABSTRACT

Conflicts detected during synchronization of replicas are enumerated and resolved according to a specified policy, comprising conditions and actions or simply a specified action. Specified actions may be drawn from a set of standard actions and custom actions may also be composed. The conflicts are enumerated and resolved in logical groups. A logical group is a collection of one or more item envelopes, each comprising entities, such as items, links, and/or extensions. In an example configuration, both constraint-based conflicts, such as a name collision, and non-constraint-based conflicts are handled via the same application programming interface.

20 Claims, 3 Drawing Sheets

OTHER PUBLICATIONS

Cohen N. H. and Purakayastha A. "Toward interoperable data synchronization with COSMOS." In Proceedings of Third IEEE Workshop on Mobile Computing Systems and Applications (Dec. 7-8, 2000, Monterey, California), pp. 138-147.

XMiddle & Mobile Healthcare Applications, elan technologies, Nov. 25, 2003, pp. 1-53 http://pizza.cs.ucl.ac.uk/~szachari/presentations/iee.pdf.

* cited by examiner

UNIFIED MECHANISM FOR PRESENTING AND RESOLVING GROUPED SYNCHRONIZATION CONFLICTS

TECHNICAL FIELD

The technical field generally is related to information storage and retrieval and more specifically to handling synchronization conflicts.

BACKGROUND

It is not uncommon for a user to possess more than one computing device. For example, a user can have a desktop computer, a server and/or a laptop computer for work or home use. The user also could have a portable device, such as a palm-top computer, a personal digital assistant (PDA), a pocket PC, a mobile phone, or the like. Typically data is copied to and between multiple devices. Often, when data is modified in one device, synchronization is required to update the other devices. For example, in preparation for business travel, a user can copy files from a desktop computer to a portable device. While away, the user then can modify and/or add files to the portable device. When the user returns, the modified/new files need to be copied to the desktop computer. This typically involves synchronization.

Synchronization ensures that designated data from multiple devices or systems are consistent. Typical synchronization systems ship changes between devices, or more specifically between data stores, and reconcile the changes if conflicts exist. For example, upon activation, a synchronization application can detect file changes or additions on a first device and copy or replicate new and/or altered files to a second device. This causes the files on the first device to be synchronized with files on the second device. Synchronization can also be performed remotely across a network. Typical synchronization systems attempt to resolve the conflict according to a policy at the time of synchronization, but are not able to resolve the conflict at a later time. Typical synchronization system also do not provide the capability to view and resolve a conflict at a granularity that users understand, with related conflicts grouped together and resolvable at the same time.

SUMMARY

This Summary is provided to introduce a selection of concepts in a simplified form that are further described below in the Detailed Description Of Illustrative Embodiments. This Summary is not intended to identify key features or essential features of the claimed subject matter, nor is it intended to be used to limit the scope of the claimed subject matter.

A conflict management application programming interface (API) allows an application to programmatically enumerates and resolves conflicts. During synchronization, detected conflicts can be logged for resolution at a later time, or resolved at the time of synchronization. Logged conflicts, as well as current conflicts, are enumerated and are resolved in accordance with a predetermined policy and/or a custom action. In an example embodiment, conflicts are enumerated and resolved at a logical group synchronization level that is understandable to a user and/or an application. Also, in the example embodiment, both constraint-based and non-constraint-based conflicts are handled by this conflict management API.

BRIEF DESCRIPTION OF THE DRAWINGS

The foregoing summary, as well as the following detailed description, is better understood when read in conjunction with the appended drawings. For the purpose of illustrating a unified mechanism for presenting and resolving grouped synchronization conflicts, there is shown in the drawings exemplary constructions thereof; however, a unified mechanism for presenting and resolving grouped synchronization conflicts is not limited to the specific methods and instrumentalities disclosed.

DETAILED DESCRIPTION OF ILLUSTRATIVE EMBODIMENTS

Figure 1:
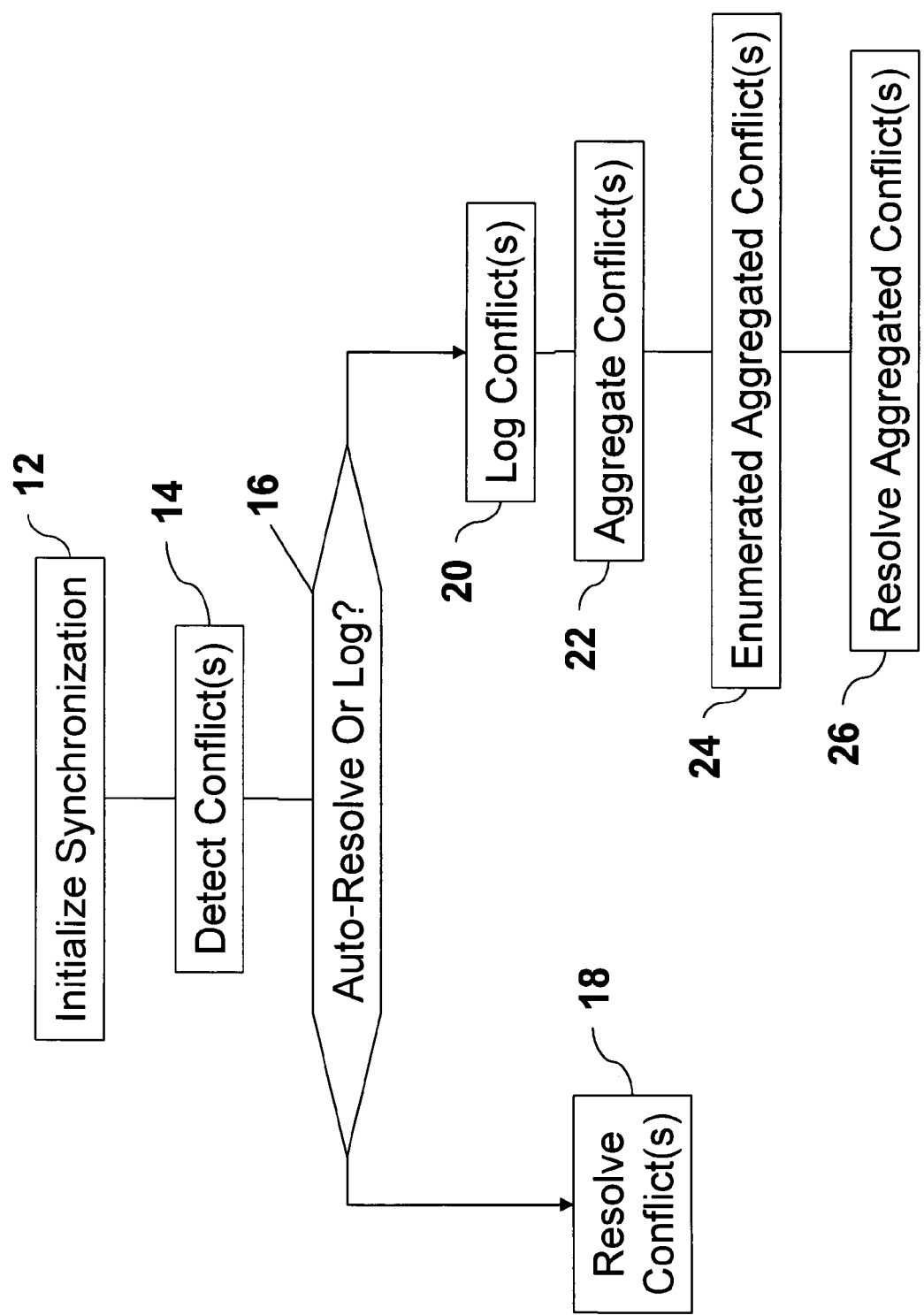
FIG. 1 is a flow diagram of an example process for enumerating and resolving conflicts at in logical groups.

A synchronization system implements synchronization among a group of participating replicas, or data stores. Multiple replicas may also exist in one data store, each replica representing a subset of the data stored in that data store. These subsets may be overlapping. Different replicas can make changes independently. Synchronization involves making every replica aware of the changes made by other replicas. The synchronization system detects concurrent changes to the same unit of change tracked data in two places (referred to as a non-constraint conflict). The synchronization system also detects conflicts in cases in which a change cannot be applied locally without violating an integrity constraint (referred to as a constraint conflict). Conflicts detected at a more granular level during synchronization are enumerated and resolved at a less granular logical group level. In an example embodiment, this is accomplished by a single conflict management application programming interface (API). This single API allows resolution of both constraint and non-constraint conflicts.

A non-constraint conflict occurs when two replicas make independent changes to the same Change Unit. A Change Unit is a smallest piece of information that is individually change tracked by a data store. When a change is made inside a Change Unit, the entire Change Unit is sent to the other replicas. Two changes are called independent if they are made without knowledge of each other. In a file system, such as WinFS, example types of non-constraint conflicts include Update-Delete, Delete-Update and Update-Update conflicts (where each name refers to a local action and a remote action in order; for example, the Update-Delete conflict is due to a local update and a remote delete to the same data).

A constraint-based conflict occurs when at least one independent change violates an integrity constraint. A constraint-based conflict can result from changes that do not affect the same Change Unit but instead affect different Change Units with constraints existing between them. For example, two replicas creating a file with the same name in the same directory can result in a constraint-based conflict. A constraint-based conflict also can result from a single change, such as when syncing between two different types of systems where one has a constraint and the other does not. For example, a system can have a constraint that the maximum file name length is eight (8) characters long. If that system receives a change to a file from another system that has no such constraint and the change is to the filename making it greater than eight characters long, a constraint conflict results (which occurred from the single change on a single machine). In the WinFS, example types of constraint-based conflicts include Insert-Insert conflict, No-Parent conflict, and Undefined-Type conflict. The Insert-Insert conflict occurs when two synchronization partners each create an object with the same logical identifier, such as a file with the same name. The No-Parent conflict occurs when the parent of an incoming object to be created does not exist. This can occur, for example, when the parent object has an Insert-Insert conflict. The Undefined-Type conflict occurs when the schema of an incoming object is not installed, preventing the object from being created.

Constraint conflicts are grouped as needed for resolution at a level that satisfies a constraint. Non-constraint conflicts are grouped up to a level of a logical item. Grouping up to a level of a logical item is more user and/or application friendly. For example, consider the case of an email message. An email message may have several parts: the message headers, the message body, and potentially several attachments. Additionally, each of these component data entities may have one or more change units. As mentioned previously, the synchronization system typically detects non-constraint conflicts at a change unit level. However, for presentation to the application and/or the user it is conceptually clearer to present these parts grouped into a single logical item, "the email message," for resolution. The system can then allow resolution of conflicts per this logical item, "the email message," as well as supporting resolution of a portion of the logical item, such as the constituent data entities, or in turn, their constituent change units, individually. In general, the grouping of non-constraint conflicts up to the level of a logical item aids in the presentation of the conflict in terms of concepts that an application and/or user can understand.

In accordance with an example embodiment of the unified mechanism for presenting and resolving grouped synchronization conflicts, conflicts are logged at the level of change units, such as the email header in the above example, and conflicts are presented for resolution in terms of a user-level data concept, e.g., the email message in the above example. In other example embodiments, for some constraint conflicts, the conflict is logged for the entire conflicting item. Note that this presentation of the conflict in terms of a user-level data element does not preclude resolving the conflict at the system-level data element level. For example, consider the case of a system synchronizing contacts. And, consider the case where both locally and remotely both a person's phone number and address are updated. If conflict resolution is only allowed at the level of the user-level data element, in the this example, the contact, then in resolution one must choose either the locally updated address and telephone number or both the remotely updated address and telephone number. Differently, if resolution is allowed at the system-level data element, one could choose both of the above options, but additionally one could choose to take the locally updated telephone number and the remotely updated address, or vice-versa. Further in accordance with the unified mechanism for presenting and resolving grouped synchronization conflicts, post-elevation, metadata pertaining to the system level primitives (e.g., change units) that are in conflict is not lost. The ability to resolve at the system data element level is preserved.

Conflicts at the change unit level are grouped at the entity level and are resolved at the entity or at the change unit level. Conflicts at the entity level (including those resulting from aggregation of change unit conflicts) are grouped to the item level and are resolved at the item or entity level. Constraint conflicts are logically grouped up to the level of data such that a reasonable resolution decision can be made. Some conflicts can cause other conflicts. For example, consider two items with a parent-child relationship. If, for an item, the parent is locally deleted and remotely a new child is added, then on a subsequent receive sync the child will have a no-parent conflict and, because of the no-parent conflict, the parent has an update-delete conflict. Thus, the conflicts can be grouped at all three levels. Also, conflicts are resolvable consistently at all three levels.

FIG. 1 is a flow diagram of an example process for enumerating and resolving conflicts in logical groups. The synchronization process is initialized at step 12. As described above, synchronization involves making every replica aware of the changes made by other replicas. During the synchronization process, if conflicts exist, they are detected at step 14. Further, if no conflicts exist, this too is detected at step 14.

Conflicts can be handled in accordance with various policy actions. For example, a policy action could automatically resolve each conflict as it is detected. Another policy action could log conflicts for subsequent resolution. At step 16, it is determined if conflicts are to be automatically resolved or logged for subsequent resolution by referring to the conflict policy. The conflict policy may require different actions for conflicts according to some differentiator. For example, conflicts for one data type may be automatically resolved, whereas conflicts for some other data type may instead be logged for later resolution. If conflicts are to be automatically resolved (step 16), the detected conflicts are resolved at step 18 according to the action stated in the policy (conflict resolution is described in more detail below).

If, according to the conflict policy, conflicts are instead to be logged for subsequent resolution (step 16), conflicts are logged at step 20. While some reported conflicts may be automatically resolved (step 18), others can be logged for later programmatic resolution at step 20. Conflict logging allows the conflict resolution process to proceed asynchronously. In an example embodiment, each conflict record contains the incoming change that caused the conflict, the type of the conflict (e.g., update-update, update-delete, delete-update, insert-insert, or constraint), the version of the incoming change, and the version metadata of the replica sending it.

Logged conflicts are aggregated at step 22. Conflicts are aggregated by the resolution API for presentation and resolution in logical groups. In an example embodiment, the logical grouping to which the conflicts are aggregated is the compound item level. An item is a unit of storable information accessible to a hardware/software interface system. An item is an object having a basic set of properties that are commonly supported across all objects exposed to an end-user. Items also have properties and relationships that are commonly supported across all item types including features that allow new properties and relationships to be introduced. A compound item is a container, or group, such that the compound item and all items contained in it form a single unit of consistency. All common operations (e.g., copy, sync, backup/restore, delete, secure) operate on the compound item as a unit. For example, the copy operation copies the whole compound item, not merely a portion of the compound item. A compound item is a collection of one or more data items. These items in turn comprise several data entities. Each data entity is divided into one or more change units for synchronization. Recalling the email message example, the compound item may be decomposed as follows: the email message comprises several items—the basic message and any attachments. Now consider the basic message item itself—it comprises several data entities, such as the message body and the message headers. These data entities in turn may be divided into one or more change units for synchronization. For example, the read flag in the message header may be in a different change unit than the from field. An item that is a part of a compound item is also known as an embedded item. In an example embodiment, items are not moved across a compound item boundary. That is, their lifetime is bound to the compound item. That is, embedded items are not moved out of a compound item and items outside a compound item are not moved into a compound item.

Conflicts, whether constraint-based conflicts or non-constraint-based conflicts, are aggregated for enumeration (step 22). Non constraint-based conflicts are detected at the level of a change unit and constraint-based conflicts are detected at entity, compound item, or item hierarchy level. For non-constraint-based conflicts, several change unit logged conflicts may be aggregated into a single entity conflict for resolution and these entity conflicts may in turn be aggregated into an item conflict for resolution. Multiple conflicts of the same type in multiple change units on the same entity are aggregated into the same conflict. Constraint-based conflicts are aggregated up to the highest level necessary in order to make a resolution decision which satisfies the constraint (e.g., to the level of the delete for an update-delete conflict). This approach provides a consistent unit for conflict enumeration.

Further, the ability is provided to aggregate dependent conflicts that may not be independently resolved, into a root level conflict. For example, in an item hierarchy, on one store a parent item may be deleted and on the other store, a child of the parent may be updated. This is an update-delete conflict on the child. In accordance with an example embodiment, the conflict is synthesized for the deleted parent and the child conflict is presented as being dependent on the resolution of the parent conflict. In the case where a parent was locally cascade deleted and a child was remotely updated, a local delete, remote update conflict will exist. However, as the only remote change was for the child, this is the item for which a conflict will be logged. However, this conflict could not be resolved independently, as the updated item cannot be resurrected and reattached to the hierarchy without also resurrecting its parents. Conflicts for the parents, which have no logged conflicts, are synthesized for presentation. In the case of a child item locally deleted and remotely updated, conflicts are synthesized. In such cases the parent has a synthetic conflict type (referred to as LocalDeleteRemoteChildUpdate) and the conflicting children are included in this list. This rule is applied recursively until the leaf conflict (of the Update-Delete) is reached. Note however that in some cases conflicts also will be synthesized down the tree. For example, consider the case where an item locally has some children added while remotely the item is deleted. In this case, after a receive sync, an update-delete conflict is logged for the parent item. However, the new child also is in conflict, as its parent was deleted by the other side without knowledge of the new child. Accordingly, though there is no logged conflict, a local update—remote delete conflict is synthesized for the child. In effect, the remote delete is treated as a cascade delete.

Aggregated conflicts are enumerated at step 24. Conflicts can be enumerated to a user, to an application, or to a combination thereof. In WinFS, for example, a Conflict API (also referred to as the conflict management API) provides a type called the ConflictReader for enumerating conflicts from the WinFS conflict log. Conflicts can be enumerated for a folder tree, for a remote replica, a data item, or a combination thereof. Conflicts deemed obsolete via inspection of metadata are suppressed. The Conflict Reader provides methods for resolving a conflict according to predetermined policy or a custom action (described in more detail below).

Aggregated conflicts are resolved at the compound item level or potentially at a more granular level (i.e., entity or change unit) if allowable for the conflict type at step 26. As described above, conflicts are tagged with a type. That is, a conflict is determined to be in accordance with a conflict type. The conflict type determines what resolutions are supported for the conflict. The type is determined dynamically at the time of enumeration. For example, the log may indicate that a conflict is an Update-Update conflict, however, the system, dynamically during enumeration, can detect that the local item was deleted, and accordingly treat the conflict as an Update-Delete conflict. Further, using metadata, it is determined when logged conflicts are obsolete in view of later changes on each store. Such conflicts are not enumerated, and are removed from the log. Also, as described above, if possible, dependent conflicts are automatically resolved when the root conflict is resolved.

The system allows resolution of conflicts according to a conflict policy. These conflict policies are employed in both automatic and programmatic conflict resolution. A Conflict Policy comprises one or more conflict rules. Each rule comprises one or more conditions, composed with condition logic, along with an action to be applied to conflicts matching the conditions. Examples of these conditions include the type of the item in conflict or the type of the conflict. The system also contains the notion of a default rule which applies to all conflicts. Evaluation of these rules is ordered, and rules are evaluated against conflicts until one is selected by some means for each conflict. In an example embodiment, conflict rules are evaluated in order, and the action taken for conflict is that specified by the first matching rule. The system provides a number of standard actions that can be used in specifying these conflict policies. Example predetermined actions include a local-wins action, a remote-wins action, a last-writer wins action, and a deterministic resolution action. The local-wins action resolves the conflict by selecting the locally stored data as the winner over the incoming data. The remote-wins action resolves the conflict by selecting the incoming data as the winner over the locally stored data. In accordance with the last-writer-wins action, either the local-wins or the remote-wins per change unit based on the timestamp of the change unit. In accordance with the deterministic resolution action, a winner is picked in a manner that is guaranteed to be the same on all replicas, such as using lexicographic comparisons of partner IDs, for example.

The Conflict API allows application of a conflict policy to a logically grouped conflict, the conflicts comprising the logically grouped conflict, or some set of logically grouped conflicts. The policy may be applied such that the system reports an error if not all conflicts are matched and resolved by the policy. The policy may be also applied such that all conflicts matching the policy are resolved and all others are left unresolved.

The Conflict API also permits resolution of a logically grouped conflict, the conflicts comprising the logical conflict, or some set of logical conflicts according to a standard conflict action directly. For example, one could select to resolve a set of conflicts according to the local-wins policy. This is distinct from the conflict policy option in that a condition (which along with an action comprises a rule in a conflict policy) need not be provided. The action may be applied such that it is considered an error if the conflict cannot be resolved according to that action. A primitive is also provided to attempt resolving a conflict according to an action, with the primitive reporting success or failure. Further a mechanism is provided for allowing applications to check if a constraint which caused a constraint conflict is no longer violated. In the constraint is no longer violated, the mechanism permits the system to "resolve" the conflict by simply reapplying the item.

The Conflict API also permits resolution of a logically grouped conflict, the conflicts comprising the logical conflict, or to some set of logical conflicts according to some custom resolution action. For example, a simple custom policy may entail that the local item with the conflicting changes overlaid is the winner. More complex custom actions are also possible. For example, the application could use the API to generate the local item with the conflict changes overlaid. The application could then make modifications to this "clone" item and then declare this modified clone the winner. An application could also provide a set of rules for composing a winner item from the conflict data and the local item, including information about what to compose and what additional non-compositional changes to make to the winning item. This set of rules could then be provided to the conflict API as an action to apply to the item, or it could also be provided as the action in some rule in a conflict policy, to be used in either automatic or programmatic conflict resolution. In an example embodiment, custom actions are effected via calls to APIs allowing declaration of a winner. The winner may be created via the previously described "cloning" operation or an application may create some new item and declare it the winner.

The synchronization service provides the conflict management API for applications to examine the conflict log, aggregate conflicts, enumerate aggregated conflicts to, and suggest resolutions of the conflicts at the compound item level or at a more granular level.

Figure 2:
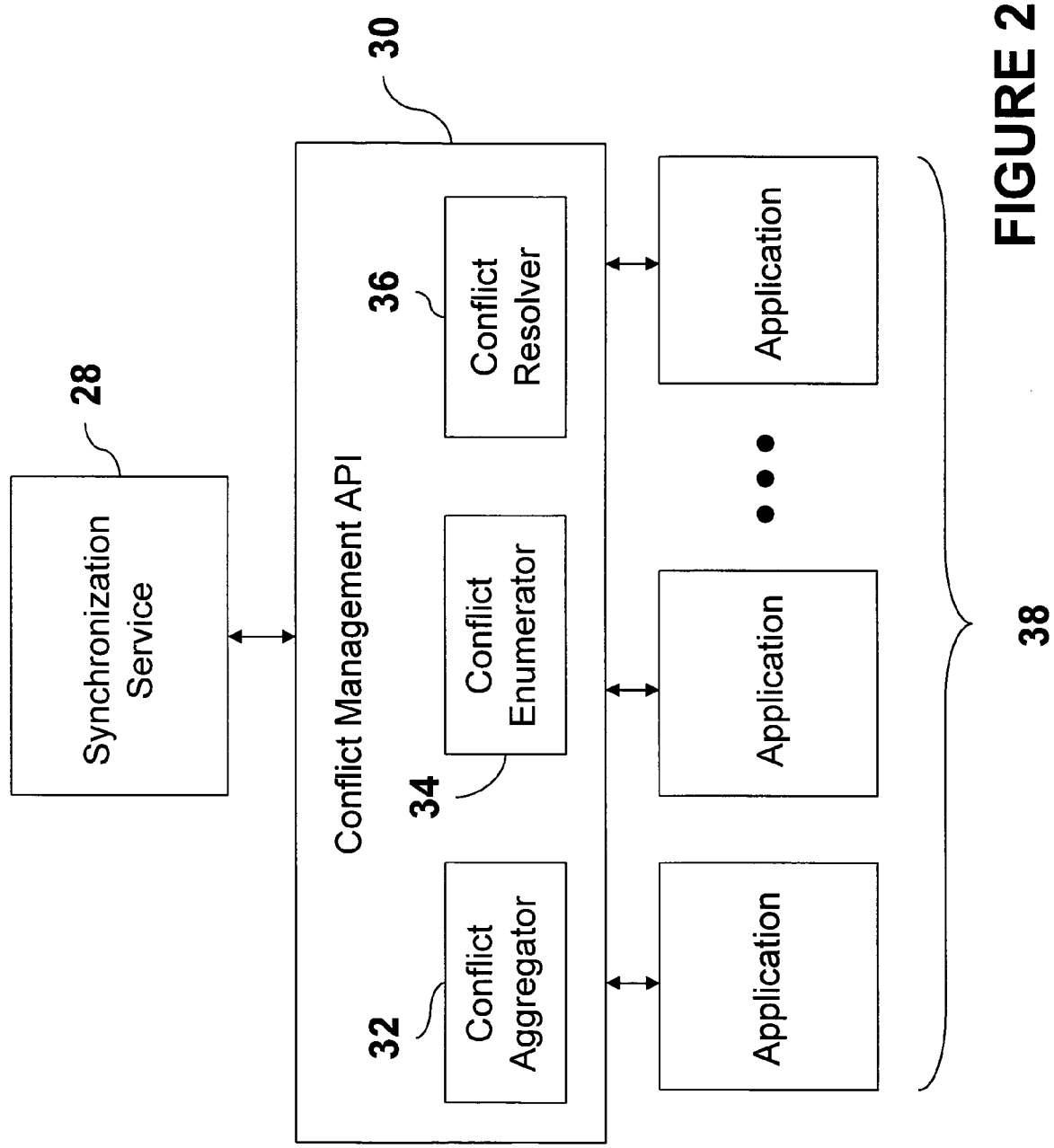
FIG. 2 is a diagram of an example conflict management API.

FIG. 2 is an illustration of an example conflict management API 30. The conflict management API 30 comprises a conflict aggregating portion 32 for aggregating logged conflicts, as described above. The conflict management API 30 also comprises a conflict enumerating portion 34 for enumerating aggregated conflicts, as described above. The conflict management API 30 further comprises a conflict resolution portion 36 for resolving aggregated conflicts and/or a portion of an aggregated conflict as previously described. The conflict management API 30 interfaces between the synchronization service 28 and various applications 38.

Figure 3:
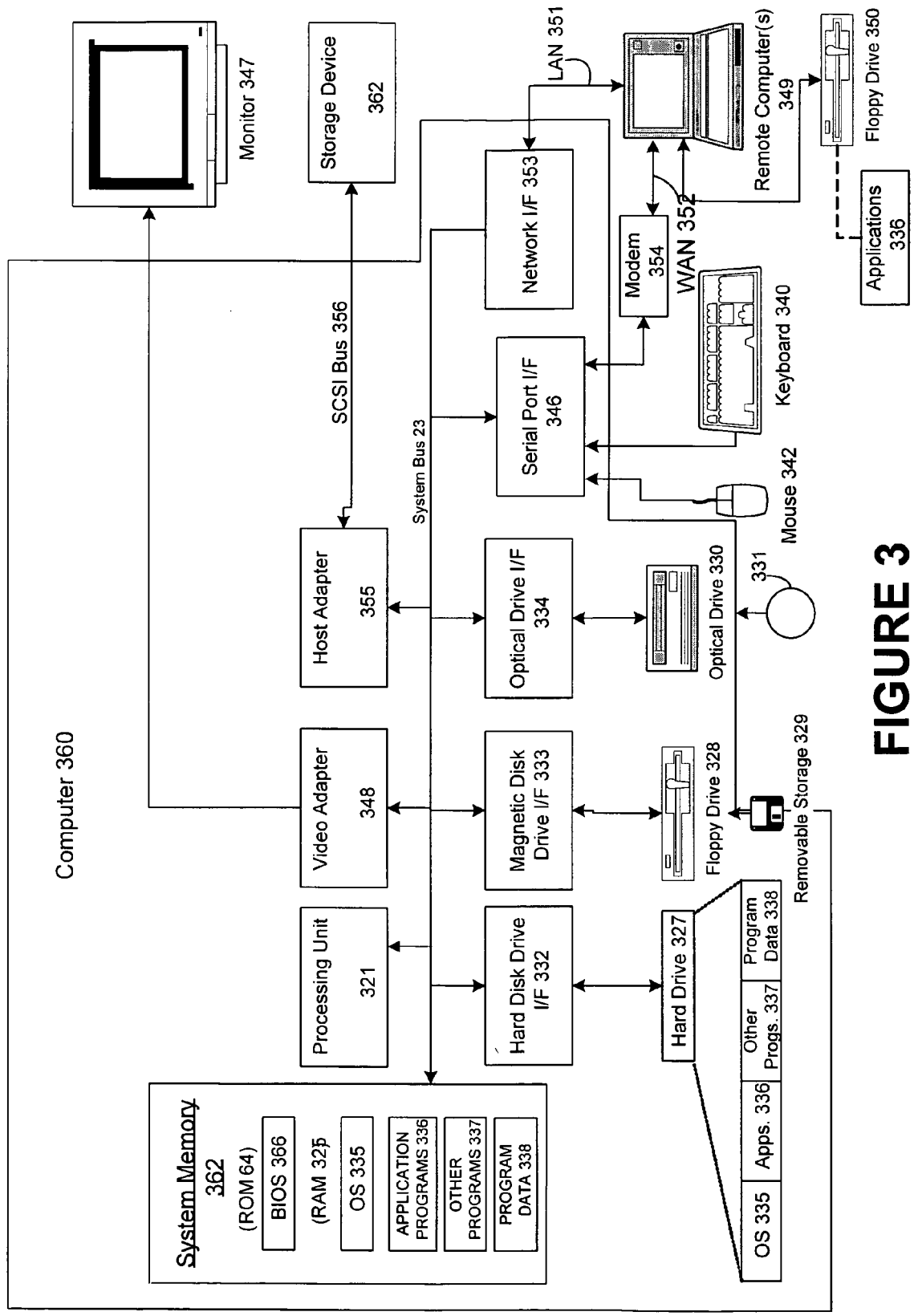
FIG. 3 is an exemplary computing environment for a unified mechanism for enumerating and resolving grouped synchronization conflicts.

Various embodiments of a unified mechanism for presenting and resolving grouped synchronization conflicts are executable on a computing device. FIG. 3 and the following discussion provide a brief general description of a suitable computing environment in which such a computing device can be implemented. Although not required, various aspects of enumerating and resolving conflicts at a compound item level can be described in the general context of computer executable instructions, such as program modules, being executed by a computer, such as a client workstation or a server. Generally, program modules include routines, programs, objects, components, data structures and the like that perform particular tasks or implement particular abstract data types. Moreover, enumerating and resolving conflicts at a compound item level can be practiced with other computer system configurations, including hand held devices, multi processor systems, microprocessor based or programmable consumer electronics, network PCs, minicomputers, mainframe computers, and the like. Further, enumerating and resolving conflicts at a compound item level also can be practiced in distributed computing environments where tasks are performed by remote processing devices that are linked through a communications network. In a distributed computing environment, program modules can be located in both local and remote memory storage devices.

As shown in FIG. 3, an exemplary general purpose computing system includes a conventional computing device 360 or the like, including a processing unit 321, a system memory 362, and a system bus 323 that couples various system components including the system memory to the processing unit 321. The system bus 323 may be any of several types of bus structures including a memory bus or memory controller, a peripheral bus, and a local bus using any of a variety of bus architectures. The system memory includes read only memory (ROM) 364 and random access memory (RAM) 325. A basic input/output system 366 (BIOS), containing basic routines that help to transfer information between elements within the computing device 360, such as during start up, is stored in ROM 364. The computing device 360 may further include a hard disk drive 327 for reading from and writing to a hard disk (hard disk not shown), a magnetic disk drive 328 (e.g., floppy drive) for reading from or writing to a removable magnetic disk 329 (e.g., floppy disk, removal storage), and an optical disk drive 330 for reading from or writing to a removable optical disk 331 such as a CD ROM or other optical media. The hard disk drive 327, magnetic disk drive 328, and optical disk drive 330 are connected to the system bus 323 by a hard disk drive interface 332, a magnetic disk drive interface 333, and an optical drive interface 334, respectively. The drives and their associated computer readable media provide non volatile storage of computer readable instructions, data structures, program modules and other data for the computing device 360. Although the exemplary environment described herein employs a hard disk, a removable magnetic disk 329, and a removable optical disk 331, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like may also be used in the exemplary operating environment. Likewise, the exemplary environment may also include many types of monitoring devices such as heat sensors and security or fire alarm systems, and other sources of information.

A number of program modules can be stored on the hard disk, magnetic disk 329, optical disk 331, ROM 364, or RAM 325, including an operating system 335, one or more application programs 336, other program modules 337, and program data 338. A user may enter commands and information into the computing device 360 through input devices such as a keyboard 340 and pointing device 342 (e.g., mouse). Other input devices (not shown) may include a microphone, joystick, game pad, satellite disk, scanner, or the like. These and other input devices are often connected to the processing unit 321 through a serial port interface 346 that is coupled to the system bus, but may be connected by other interfaces, such as a parallel port, game port, or universal serial bus (USB). A monitor 347 or other type of display device is also connected to the system bus 323 via an interface, such as a video adapter 348. In addition to the monitor 347, computing devices typically include other peripheral output devices (not shown), such as speakers and printers. The exemplary system of FIG. 3 also includes a host adapter 355, Small Computer System Interface (SCSI) bus 356, and an external storage device 362 connected to the SCSI bus 356.

The computing device 360 may operate in a networked environment using logical connections to one or more remote computers, such as a remote computer 349. The remote computer 349 may be another computing device (e.g., personal computer), a server, a router, a network PC, a peer device, or other common network node, and typically includes many or all of the elements described above relative to the computing device 360, although only a memory storage device 350 (floppy drive) has been illustrated in FIG. 3. The logical connections depicted in FIG. 3 include a local area network (LAN) 351 and a wide area network (WAN) 352. Such networking environments are commonplace in offices, enterprise wide computer networks, intranets and the Internet.

When used in a LAN networking environment, the computing device 360 is connected to the LAN 351 through a network interface or adapter 353. When used in a WAN networking environment, the computing device 360 can include a modem 354 or other means for establishing communications over the wide area network 352, such as the Internet. The modem 354, which may be internal or external, is connected to the system bus 323 via the serial port interface 346. In a networked environment, program modules depicted relative to the computing device 360, or portions thereof, may be stored in the remote memory storage device. It will be appreciated that the network connections shown are exemplary and other means of establishing a communications link between the computers may be used.

A computer system can be roughly divided into three component groups: the hardware component, the hardware/software interface system component, and the applications programs component (also referred to as the "user component" or "software component"). In various embodiments of a computer system the hardware component may comprise the central processing unit (CPU) 31, the memory (both ROM 364 and RAM 325), the basic input/output system (BIOS) 366, and various input/output (I/O) devices such as a keyboard 340, a mouse 342, a monitor 347, and/or a printer (not shown), among other things. The hardware component comprises the basic physical infrastructure for the computer system.

The applications programs component comprises various software programs including but not limited to compilers, database systems, word processors, business programs, videogames, and so forth. Application programs provide the means by which computer resources are utilized to solve problems, provide solutions, and process data for various users (machines, other computer systems, and/or end-users).

The hardware/software interface system component comprises (and, in some embodiments, may solely consist of) an operating system that itself comprises, in most cases, a shell and a kernel. An "operating system" (OS) is a special program that acts as an intermediary between application programs and computer hardware. The hardware/software interface system component may also comprise a virtual machine manager (VMM), a Common Language Runtime (CLR) or its functional equivalent, a Java Virtual Machine (JVM) or its functional equivalent, or other such software components in the place of or in addition to the operating system in a computer system. The purpose of a hardware/software interface system is to provide an environment in which a user can execute application programs.

The hardware/software interface system is generally loaded into a computer system at startup and thereafter manages all of the application programs in the computer system. The application programs interact with the hardware/software interface system by requesting services via an application program interface (API). Some application programs enable end-users to interact with the hardware/software interface system via a user interface such as a command language or a graphical user interface (GUI).

A hardware/software interface system traditionally performs a variety of services for applications. In a multitasking hardware/software interface system where multiple programs may be running at the same time, the hardware/software interface system determines which applications should run in what order and how much time should be allowed for each application before switching to another application for a turn. The hardware/software interface system also manages the sharing of internal memory among multiple applications, and handles input and output to and from attached hardware devices such as hard disks, printers, and dial-up ports. The hardware/software interface system also sends messages to each application (and, in certain case, to the end-user) regarding the status of operations and any errors that may have occurred. The hardware/software interface system can also offload the management of batch jobs (e.g., printing) so that the initiating application is freed from this work and can resume other processing and/or operations. On computers that can provide parallel processing, a hardware/software interface system also manages dividing a program so that it runs on more than one processor at a time.

A hardware/software interface system shell (referred to as a "shell") is an interactive end-user interface to a hardware/software interface system. (A shell may also be referred to as a "command interpreter" or, in an operating system, as an "operating system shell"). A shell is the outer layer of a hardware/software interface system that is directly accessible by application programs and/or end-users. In contrast to a shell, a kernel is a hardware/software interface system's innermost layer that interacts directly with the hardware components.

While it is envisioned that numerous embodiments of enumerating and resolving conflicts at a compound level are particularly well-suited for computerized systems, nothing in this document is intended to limit the invention to such embodiments. On the contrary, as used herein the term "computer system" is intended to encompass any and all devices capable of storing and processing information and/or capable of using the stored information to control the behavior or execution of the device itself, regardless of whether such devices are electronic, mechanical, logical, or virtual in nature.

The various techniques described herein can be implemented in connection with hardware or software or, where appropriate, with a combination of both. Thus, the methods and apparatuses for a unified mechanism for presenting and resolving grouped synchronization conflicts, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for a unified mechanism for presenting and resolving grouped synchronization conflicts.

The program(s) can be implemented in assembly or machine language, if desired. In any case, the language can be a compiled or interpreted language, and combined with hardware implementations. The methods and apparatuses for a unified mechanism for presenting and resolving grouped synchronization conflicts also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for enumerating and resolving conflicts at a compound item level. When implemented on a general-purpose processor, the program code combines with the processor to provide a unique apparatus that operates to invoke the functionality a unified mechanism for presenting and resolving grouped synchronization conflicts. Additionally, any storage techniques used in connection with a unified mechanism for presenting and resolving grouped synchronization conflicts can invariably be a combination of hardware and software.

While a unified mechanism for presenting and resolving grouped synchronization conflicts has been described in connection with the example embodiments of the various figures, it is to be understood that other similar embodiments can be used or modifications and additions can be made to the described embodiments for performing the same functions for a unified mechanism for presenting and resolving grouped synchronization conflicts without deviating therefrom. Therefore, a unified mechanism for presenting and resolving grouped synchronization conflicts as described herein should not be limited to any single embodiment, but rather should be construed in breadth and scope in accordance with the appended claims.

What is claimed:

1. A method for communicating with a computer program application, the method comprising:
    receiving an indication that at least one conflict has been detected during synchronization of at least two replicas, wherein the at least one conflict is detected at a first granular unit level;
    aggregating the at least one conflict into a user-understandable logical group in which the at least one conflict is grouped into an aggregated conflict for resolution at a second granular unit level, which is less than the first granular unit level;
    enumerating, to the application, the aggregated conflict; and
    resolving the at least one conflict within the aggregated conflict at the second granular unit level.

2. The method in accordance with claim 1, wherein the at least one conflict comprises at least one of a constraint-based conflict and a non-constraint-based conflict.

3. The method in accordance with claim 1, further comprising resolving one of the aggregated conflict and each one of the at least one conflict in accordance with a respective predetermined policy.

4. The method in accordance with claim 1, further comprising resolving one of the aggregated conflict and each one of the at least one conflict in accordance with a respective action.

5. The method in accordance with claim 1, wherein:
    the at least one conflict comprises a plurality of conflicts;
    each one of the plurality of conflicts is identified in accordance with a hierarchy comprising a plurality of levels; and
    the aggregated conflict belongs to a highest level of the hierarchy at which the aggregated conflict is at least one of resolvable and enumeratable.

6. The method in accordance with claim 1, wherein:
    the at least one conflict comprises a plurality of dependent conflicts that are independently unresolvable;
    each one of the plurality of dependent conflicts is identified in accordance with a hierarchy comprising a plurality of levels;
    the plurality of levels comprises a first level and at least one lower level;
    at least one of the plurality of dependent conflicts belongs to the first level and remaining ones of the plurality of dependent conflicts belong to the at least one lower level; and
    upon resolving the at least one dependent conflict belonging to the first level, the remaining ones of the plurality of dependent conflicts are automatically resolved.

7. The method in accordance with claim 1, wherein the at least one conflict comprises a plurality of dependent conflicts, the method further comprising:
    synthesizing a conflict for at least one of the dependent conflicts; and
    aggregating the at least one conflict and the synthesized conflict.

8. The method in accordance with claim 1, wherein:
    the aggregated conflict is resolved in accordance with a conflict type; and
    the conflict type is determined at a time of enumeration.

9. A computer readable storage medium comprising computer executable instructions stored thereon, wherein the computer executable instructions are executable by a computer to perform acts for implementing a conflict management application programming interface for interfacing with an application, the acts comprising:
    implementing a conflict aggregating portion of said application programming interface for aggregating at least one conflict into an aggregated conflict, which is detected during synchronization of at least two replicas, wherein the at least one conflict is detected at a first granular unit level, and wherein the at least one conflict is aggregated for resolution at a second granular unit level, which is less than the first granular unit level;
    implementing a conflict enumerating portion of said application programming interface for enumerating, to the application, the aggregated conflict; and
    implementing a conflict resolution portion of said application programming interface for resolving the at least one conflict within the aggregated conflict at the second granular unit level.

10. The computer readable storage medium in accordance with claim 9, wherein the at least one conflict comprises at least one of a constraint-based conflict and a non-constraint-based conflict.

11. The computer readable storage medium in accordance with claim 9, wherein the conflict resolution portion is further implemented for resolving one of the aggregated conflict and each one of the at least one conflict in accordance with a respective at least one of a predetermined policy and an action.

12. The computer readable storage medium in accordance with claim 9, wherein:
    the at least one conflict comprises a plurality of dependent conflicts;
    a conflict is synthesized for at least one of the dependent conflicts; and
    the at least one conflict and the synthesized conflict are aggregated.

13. The computer readable storage medium in accordance with claim 9, wherein:
    the at least one conflict comprises a plurality of conflicts;
    each one of the plurality of conflicts is a member of a hierarchy comprising a plurality of levels; and
    the aggregated conflict belongs to a highest level of the hierarchy at which the aggregated conflict is at least one of resolvable and enumeratable.

14. The computer readable storage medium in accordance with claim 9, wherein:

the at least one conflict comprises a plurality of dependent conflicts that are independently unresolvable;

each one of the plurality of dependent conflicts is a member of a hierarchy comprising a plurality of levels;

the plurality of levels comprises a first level and at least one lower level;

at least one of the plurality of dependent conflicts belongs to the first level and remaining ones of the plurality of dependent conflicts belong to the at least one lower level; and the conflict resolution portion is further implemented for, upon resolving the at least one dependent conflict belonging to the first level, automatically resolving the remaining ones of the plurality of dependent conflicts.

15. A method for resolving conflicts at a logical group level, the method comprising:

initializing synchronization between at least two replicas;

detecting at least one conflict between the at least two replicas, wherein the at least one conflict is detected at a first granular unit level;

logging the at least one conflict in a conflict log;

aggregating conflicts from the conflict log into a user-understandable logical group in which conflicts are grouped into an aggregated conflict for resolution at a second granular unit level, which is less than the first granular unit level;

enumerating the aggregated conflict; and resolving the at least one conflict within the aggregated conflict at the second granular unit level.

16. The method in accordance with claim 15, wherein the at least one conflict comprises at least one of a constraint-based conflict and a non-constraint-based conflict.

17. The method in accordance with claim 15, further comprising resolving one of the aggregated conflict and each one of the at least one conflict in accordance with a respective at least one of a predetermined policy and an action.

18. The method in accordance with claim 15, wherein the at least one conflict comprises a plurality of dependent conflicts, the method further comprising:

synthesizing a conflict for at least one of the dependent conflicts; and aggregating the at least one conflict and the synthesized conflict.

19. The method in accordance with claim 15, wherein:

the at least one conflict comprises a plurality of conflicts;

each one of the plurality of conflicts is identified in accordance with a hierarchy comprising a plurality of levels; and the aggregated conflict belongs to a highest level of the hierarchy at which the aggregated conflict is resolvable.

20. The method in accordance with claim 15, wherein:

the at least one conflict comprises a plurality of dependent conflicts that are independently unresolvable;

each one of the plurality of dependent conflicts is identified in accordance with a hierarchy comprising a plurality of levels;

the plurality of levels comprises a first level and at least one lower level;

at least one of the plurality of dependent conflicts belongs to the first level and remaining ones of the plurality of dependent conflicts belong to the at least one lower level; and upon resolving the at least one dependent conflict belonging to the first level, the remaining ones of the plurality of dependent conflicts are automatically resolved.

* * * * *